(12) United States Patent  (10) Patent No.: US 6,543,756 B2
Ihara et al.  (45) Date of Patent: Apr. 8, 2003

(54) ENGINE MOUNT

(75) Inventors: Yoshio Ihara, Osaka (JP); Kentaro Yamamoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/935,221

(22) Filed: Aug. 22, 2001

(65) Prior Publication Data

US 2002/0036371 A1 Mar. 28, 2002

(30) Foreign Application Priority Data

Sep. 7, 2000 (JP) ....................................... 2000-272219

(51) Int. Cl.[7] ............................................... F16F 13/00
(52) U.S. Cl. .................................. 267/140.13; 180/291
(58) Field of Search ........................ 267/140.11, 140.12, 267/140.13, 141, 141.1–141.7; 180/291, 292–300, 311, 312; 248/636, 637, 638, 562

(56) References Cited

U.S. PATENT DOCUMENTS 4,215,842 A * 8/1980 Brenner et al. ............. 248/634
4,288,063 A * 9/1981 Brenner et al. ............. 248/635

FOREIGN PATENT DOCUMENTS

JP 62-89545 6/1987
JP 8-4815 1/1996
JP 9-207584 8/1997

* cited by examiner

Primary Examiner—Pam Rodriguez
(74) Attorney, Agent, or Firm—Jordan and Hamburg LLP

(57) ABSTRACT

An engine mount to be installed above an opening of a vehicle body member to support the engine in vibration-proof fashion, on which the intrusion of foreign matter from the opening can be precluded without increase in components. It comprises a cylindrical main body fitting, an upper fitting, a vibration-insulating base of rubber elastomer interconnecting both fittings, a diaphragm disposed within the main body fitting to face to the base, and a liquid-sealed chamber partly enclosed by the diaphragm, the diaphragm being integrally provided at its lower circumferential end with a cylindrical rubber extension. The rubber extension extends downwardly from the diaphragm, lower edge thereof being turned-up to come in contact with a peripheral edge portion around the opening thereby to close the opening.

9 Claims, 4 Drawing Sheets

ENGINE MOUNT

BACKGROUND OF THE INVENTION

1. Field of the Invention

This invention relates to an engine mount.

2. Description of the Related Art

In general, engine mounts are used for supporting an automobile engine inside the engine room to the vehicle body member in vibration-insulating manner.

For example, a conventional engine mount is shown in FIG. 6, which is a longitudinal sectional view. This engine mount 100 is a liquid-sealed type vibration-proof mount which comprises an upper fitting 101 to be attached to the engine side not shown, a main body fitting 103 to be fixed to the vehicle body member 100 supporting the engine through a bracket 102, a vibration-insulating base 104 made of rubber elastomer interconnecting the upper fitting and the main body fitting, a diaphragm 105 opposed to the vibration-insulating base 104 inside the main body fitting 103, and a liquid-sealed chamber 106 constituting the interior enclosed by the diaphragm.

With the construction of the engine mount 100 of the type shown in FIG. 6, the vehicle body member 110 below the engine mount may be provided with an opening 111. In case where the opening 111 is thus provided, extraneous matter (EM) such as pebbles, gravel is likely to enter the engine room to intrude through the opening 111 into the member 110.

Once entering the member 110, such extraneous matter is very difficult to remove, and in order to prevent extraneous matter from intruding from the opening 111, for example, a separate rubber cap or the like may be fitted to the opening to close it. However, this expedient of closing by means of a separate component from the engine mount causes an increase in number of the component pieces assembled, which leads to a problem of cost increase.

In view of the prior art problem, this invention has been made and has for an object to provide an engine mount capable of preventing extraneous matter from entering through an opening provided in a vehicle body member without entailing the increase in number of component pieces.

SUMMARY OF THE INVENTION

This invention consists in an engine mount adapted to be installed above an opening of a vehicle body member to support an engine in a vibration-insulating manner, comprising a main body fitting having a cylindrical drum, an upper fitting, a vibration-insulating base made of rubber elastomer interconnecting the main body fitting and the upper fitting, a diaphragm disposed within the main body fitting so as to be opposed to the vibration-insulating base, and a liquid-sealed chamber, a part of whose wall is formed by the diaphragm, wherein a rubber extension of generally cylindrical form is provided to extend downwardly from a lower peripheral portion of the diaphragm so as to be made integral with it, thereby to close the opening of the vehicle body member.

According to the engine mount of this invention, the opening provided in the vehicle body member located downwards can be closed by the rubber extension of a generally cylindrical form made integral with the diaphragm, so that it is possible to avoid the intrusion of extraneous matter from the opening without the necessity of additional component pieces.

In the engine mount of this invention, it is preferred that the aforementioned rubber extension project downwardly of the opening of the aforementioned member, and be turned up at a lower projecting end thereof toward its outer circumference so that the turnup end may come in contact with a lower surface of a peripheral edge of the opening of the member thereby to close the opening.

By turning up the rubber extension and bringing the turnup end into contact with the lower surface of the peripheral edge around the opening in this manner, it is possible to close the opening with no clearance and to absorb dimensional dispersion among the members.

According to another embodiment of the engine mount in this invention, the rubber extension is bent and turned up toward its outer circumference so that the bent portion is in contact with an upper surface of the circumferential edge around the opening of the member thereby to close the opening.

Thus by bringing the bent portion of the rubber extension into contact with the upper surface of the circumferential edge around the opening, it is possible to shut off the opening without clearance and to absorb dimensional dispersion among the members.

In the preceding engine mount, the rubber extension further may be provided with a thin-walled portion that serves as a bending portion when turned up.

By this means it is possible to determine the bending and turning-up position of the rubber extension at a definite position and to adjust easily the height of bending location by varying the position of the thin-walled portion. Since the rubber extension is bent at the thin-walled portion, the turnup portion is less prone to revert to the original state.

In the preceding engine mount, it is also possible to further provide a thick-walled portion at an entire lower circumferential extremity of the cylindrical rubber extension.

In that case, when the rubber extension is turned up, the turnup end is of the thick-walled portion, which is difficult to unfold in nature, so that it is possible to prevent the turnup portion from reverting to the initial state.

BRIEF DESCRIPTION OF THE DRAWINGS

Embodiments of the invention will be described in more detail with reference to the accompanying drawings, in which.

DESCRIPTION OF THE PREFERRED EMBODIMENTS

Figure 1:
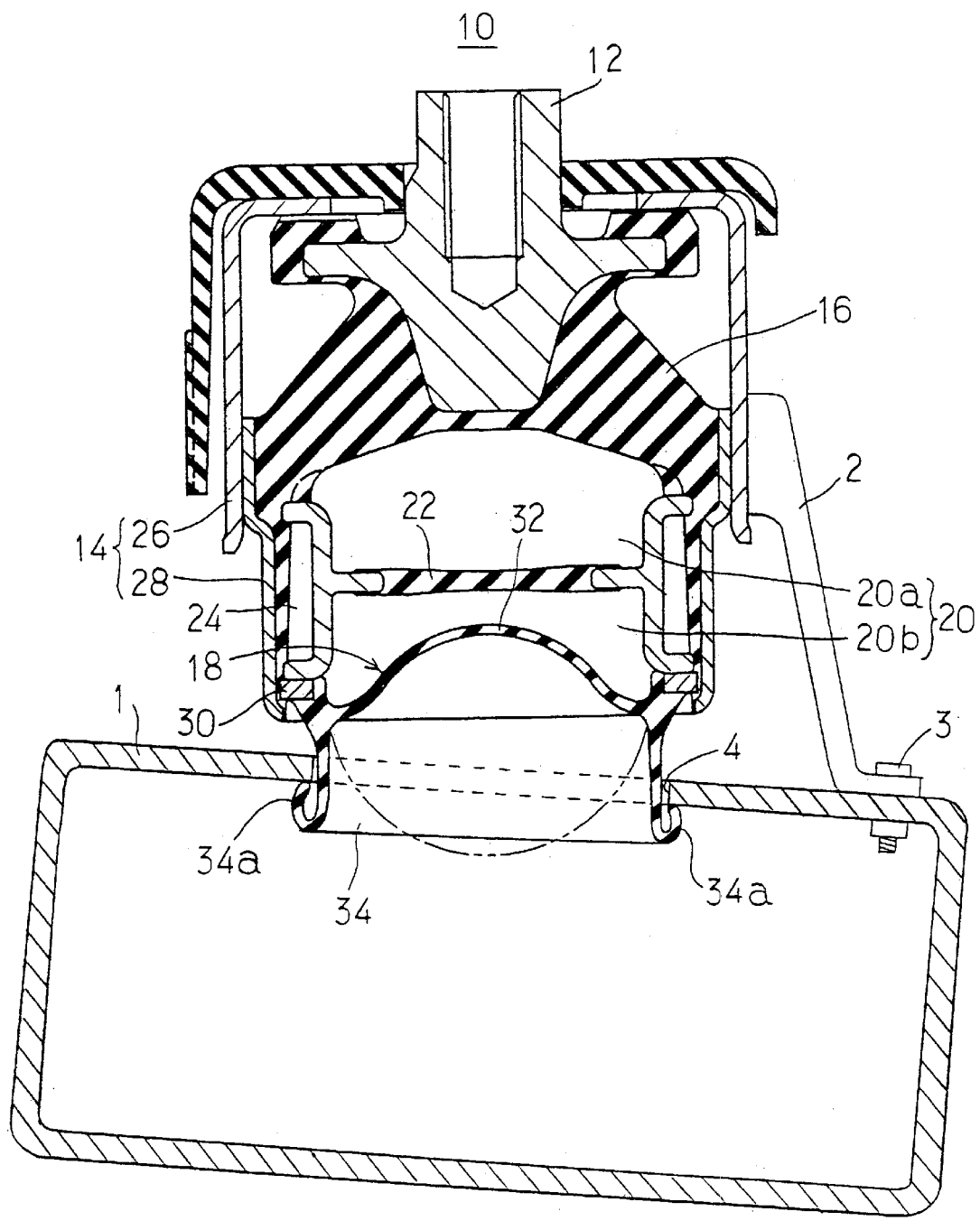
FIG. 1 is a longitudinal cross-sectional view showing one example of an engine mount pertaining to this invention.

Now referring to FIG. 1 illustrating one embodiment of this invention, an engine mount 10 is constructed as a liquid-sealed vibration-proof mount and comprises an upper fitment 12 to be attached to the engine side not shown, a main body fitting 14 to be attached to the vehicle body member 1, a vibration-insulating base 16 made of rubber elastomer interconnecting the former two in flexible manner, and a diaphragm 18 disposed to face to the vibration-insulating base 16. The interior of the diaphragm is formed as a liquid-sealed chamber 20, which is partitioned by a partition member 22 into two upper and lower chambers 20a, 20b. Both chambers are put into communication with each other through an orifice 24. In the engine mount thus constructed, a vibration damping function and a vibration insulation function are performed owing to a liquid flow effect through the orifice 24 between both liquid chambers 20a, 20b and a vibration-absorbing effect of the vibration-insulating base 16.

More specifically, the upper fitting 12 assumes a generally top-like shape and is embedded at its lower part within the vibration-insulating base 16. The main body fitting 14 consists of a first fitting 26 of an inverted bowl form and a second fitting 28 of a cylindrical form, which is press-fitted into the first fitting 26 from its lower opening and vulcanization bonded to the vibration-insulating base 16 at its inner circumference. The first fitting 26 is fastened to a vehicle body member 1 of a rectangular cylindrical form through a bracket 2 with bolts 3.

The diaphragm 18 is provided with a ring-form fitting 30 and a circular rubber membrane 32 vulcanization bonded to the inner periphery of the fitting 30, the ring-form fitting 30 being fitted to the main fitting 14 at its inner periphery surface. The rubber membrane 32 is constructed as a part of the wall of the liquid-sealed chamber 20 and to be deformable in a downwardly inflating manner.

At the vehicle body member 1, there is provided an opening 4 of circular form below the engine mount 10 so that the opening may receive the rubber membrane 32 of the diaphragm 18 deforming to expand downwardly. The opening 4 has a slightly smaller diameter than the outside diameter of the main body fitting 14. The vehicle body member 1 is arranged in a somewhat slanting state to the engine mount 10.

The diaphragm 18 is provided integrally with a rubber extension 34 of generally cylindrical form, which extends downwardly from a lower surface of the peripheral edge thereof where the ring-form fitting 30 is disposed. The rubber extension 34 assumes, in the embodiment of FIG. 2, a skirt-like shape diverging in a slightly reverse taper form at its lower part.

As shown in FIG. 1, the rubber extension 34 is constructed so that it projects downwardly from the opening 4 of the vehicle body member 1 and the lower projecting end of the rubber extension 34 is turned up on the outer circumference side with its turnup portion 34a abutting at its top end on a lower surface of the entire circumferential edge portion around the opening of the member 1, whereby the opening 4 is closed. Here, the turnup portion 34a is turned up to follow the slanting attitude of the member 1.

Figure 2:
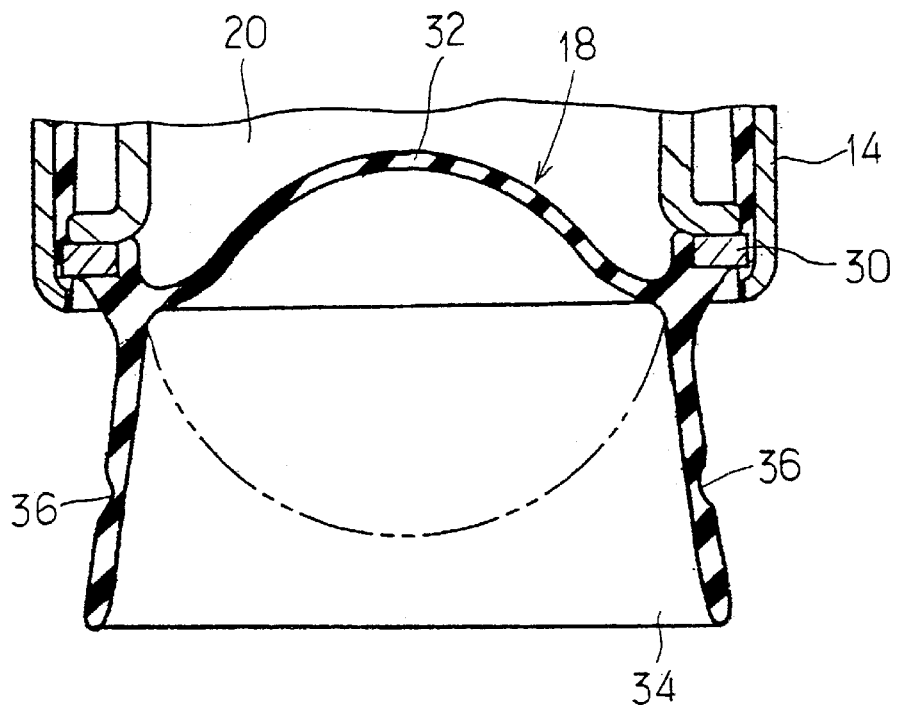
FIG. 2 is an enlarged sectional view of the engine mount in FIG. 1 before installed to the vehicle showing essential parts of it.

In the rubber extension 34, a dent or notch is defined circumferentially at its position corresponding to the bending position upon turning up, as shown in FIG. 2, affording a thin-walled portion 36. Thus the turnup portion 34a is made difficult to revert to the original state by bending and turning up the rubber extension 34 at the thin-walled portion 36.

According to the engine mount 10 of the invention, the opening 4 of the vehicle body member 1 below it is closed by the rubber extension 34 integrally formed with the diaphragm 18 and hence it is possible to preclude intrusion of foreign matter from the opening 4 into the member 1 without increasing the number of component pieces and accordingly, at a low cost.

Since the rubber extension 34 is turned up with the top end of the turnup portion 34a made in contact with the lower surface of the open circumferential edge, the opening 4 can be closed completely without any clearance. Aside from above, there is a possibility of constructing the rubber extension 34 so that it is inserted into the opening 4 without turning up, but in that case it is probable that foreign matter may enter a small clearance between it and the opening. In contrast, in accordance with this invention this cannot happen and such clearance can be rid of by making the top end of the turnup portion 34a into contact with the open circumferential edge.

Furthermore the extension 34 is formed of a one-piece rubber extending from the diaphragm 18 and as such it is possible to absorb dimensional scattering among vehicle body members 1 such as difference in diameter of the opening 4.

Again, the formation of the thin-walled portion 36 in the rubber extension 34 enables it to make the bending and turning-up position of the rubber extension 34 definite, and facilitates adjusting the height of the bending position by varying the position of the thin-walled portion 36.

Figure 3:
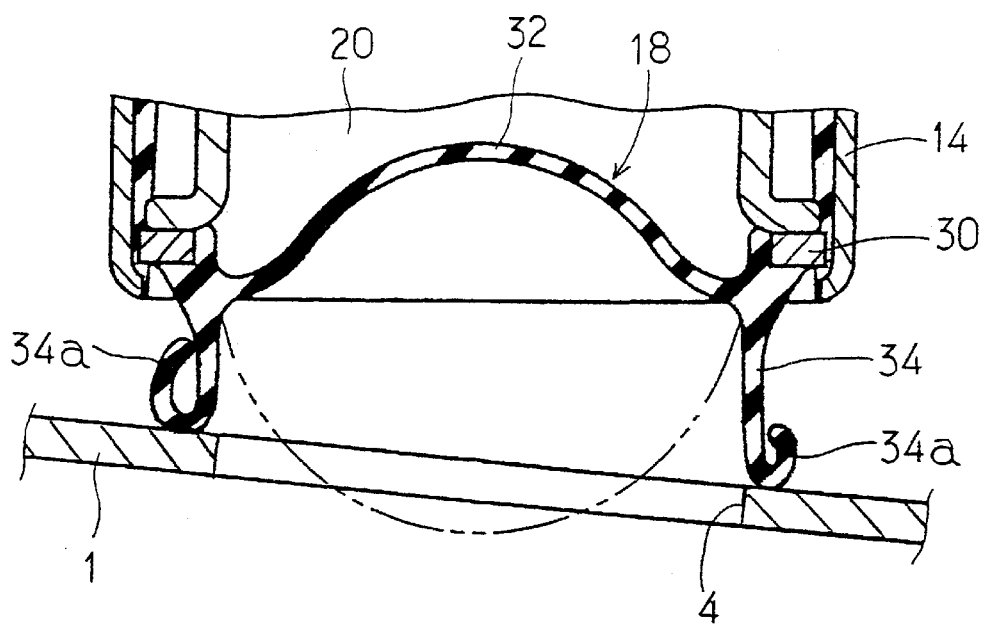
FIG. 3 is an enlarged sectional view of another example of an engine mount showing its essential parts.

Another example of the engine mount according to this invention is shown in FIG. 3. This embodiment is different from the preceding embodiment in the bending and turning-up position of the rubber extension 34. That is, the rubber extension 34 is bent and turned up toward the outer circumference short of the opening 34 and the bent portion is put into abutment on the upper surface of the entire circumferential edge around the opening thereby closing the opening 4.

By turning up the rubber extension 34 and making the bent portion in abutment on the upper surface of the open circumferential edge in this way, it is likewise possible to close the opening 4 with no clearance and to absorb dimensional scattering among vehicle body members 1.

Figure 4A:
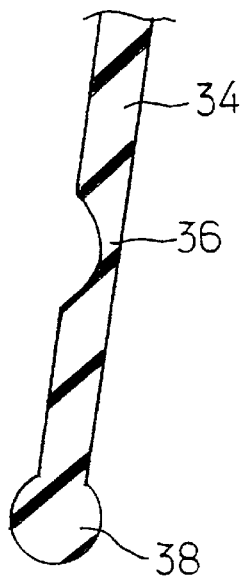
FIG. 4A and FIG. 4B are an enlarged sectional view showing a variation of the rubber extension and a sectional view of it when installed to the vehicle, respectively.

FIG. 4 is further variation example of the rubber extension 34. As shown in FIG. 4A, a thick-walled portion 38 of circular form in cross-section is provided, at the top end of the rubber extension 34 of generally cylindrical form, to the entire open circumferential edge. That is, the rubber extension 34 is thick-walled at its lower extremity.

Figure 4B:
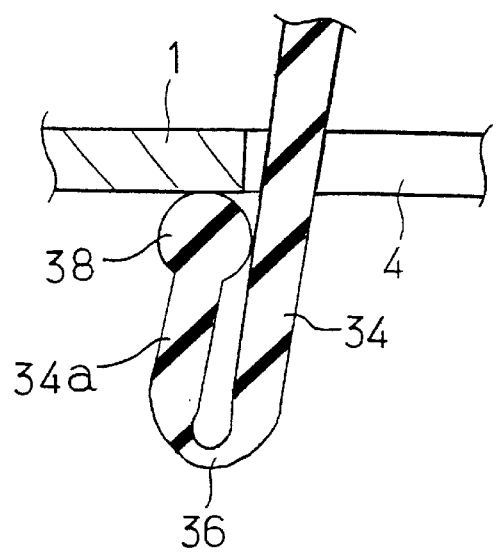

Here, when the rubber extension 34 is turned up as shown in FIG. 4B, the thick-walled portion 38 at the top end of the turnup end 34a is difficult to fold out or unfold and consequently, it is possible to prevent the turnup portion 34a from reverting to the original position. On account of the fact that the top end of the turnup portion 34a to be abutted against the vehicle body member 1 is the thick-walled portion 38, it is possible to enhance the sealing ability to the member 1.

Figure 5B:
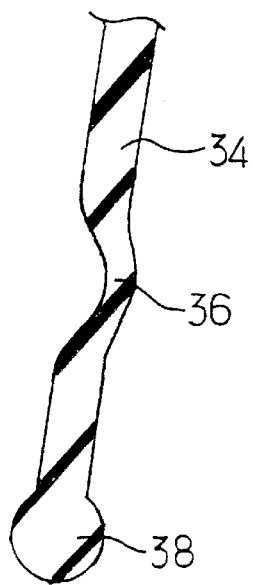
FIG. 5A and FIG. 5B are respective enlarged sectional views of other variations of the rubber extension.
Figure 5A:
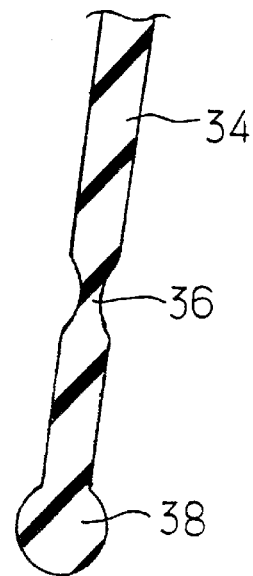
Figure 6:
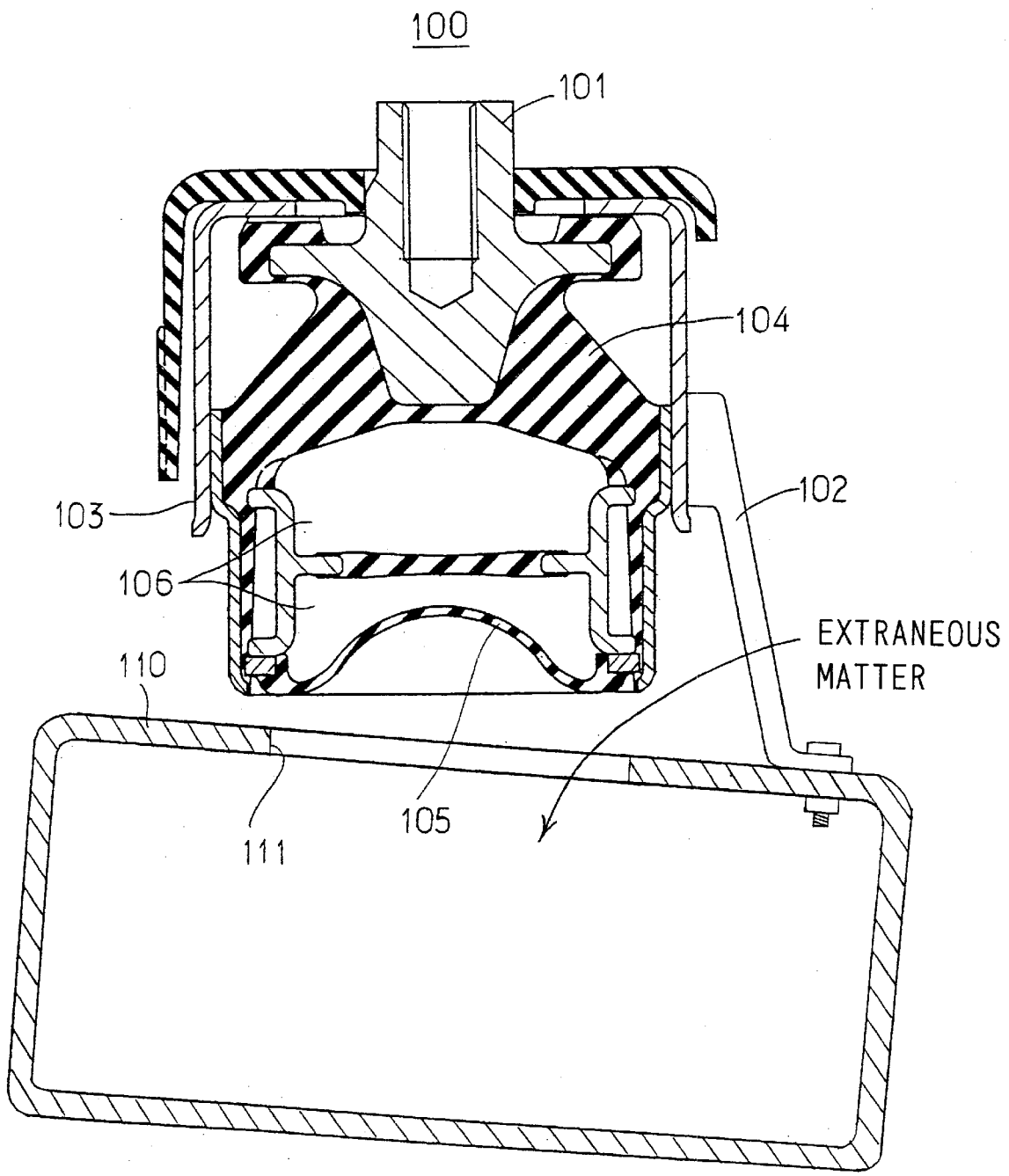
FIG. 6 is a longitudinal sectional view of a conventional engine mount.

FIG. 5 is still further variation example of the rubber extension 34, particularly showing variations of its thin-walled portion 36. The thin-walled portion 36 illustrated in FIG. 5A is configured to be curved inwardly of the rubber extension 34 while the thin-walled portion 36 of FIG. 5B is formed as inward and outward dents or notches. It is thus possible to adopt a variety of shapes as the shape of the thin-walled portion 36.

The description of the aforementioned embodiments was made to the case where the vehicle body member 1 is of a rectangular cylindrical form, but it should be appreciated in this invention that the vehicle body member 1 is not limited to such cylindrical form and may also be a plate form. With the vehicle body member of a plate form, the rubber extension for closing the opening of it can prevent foreign matter from entering the opening from underside.

According to the engine mount of this invention, it is possible to close the opening provided in the vehicle body member below the mount by means of the rubber extension of generally cylindrical form made integral with the diaphragm, and consequently, intrusion of foreign matter from the opening can be prevented.

What we claim is:

1. An engine mount adapted to be installed above an opening of a vehicle body member to support an engine in a vibration-insulating manner, which comprises a main body fitting having a cylindrical drum, an upper fitting, a vibration-insulating base made of rubber elastomer interconnecting the main body fitting and the upper fitting, a diaphragm disposed within the main body fitting and located opposite from the vibration-insulating base, and a liquid-sealed chamber, a part of whose wall is formed by the diaphragm, wherein a rubber extension portion of generally cylindrical form is provided to be made integral with the diaphragm so as to extend from a lower peripheral portion thereof downwardly, thereby to close the opening of the vehicle body member.

2. The engine mount as set forth in claim 1, wherein the rubber extension projects downwardly from the opening of the member, with a lower projecting end thereof turned up toward its outer circumference so that the resulting turnup end is in contact with a lower surface of a peripheral edge of the opening of the member thereby to close the opening.

3. The engine mount as set forth in claim 2, wherein the rubber extension is provided with a thin-walled portion serving as a bending portion.

4. The engine mount as set forth in claim 3, wherein the rubber extension of generally cylindrical form is provided with at its entire lower circumferential extremity with a thick-walled portion.

5. The engine mount as set forth in claim 2, wherein the rubber extension of generally cylindrical form is provided with at its entire lower circumferential extremity with a thick-walled portion.

6. The engine mount as set forth in claim 1, wherein the rubber extension is bent and turned up toward its outer circumference so that the bent portion is in contact with an upper surface of a peripheral edge around the opening of the member thereby to close the opening.

7. The engine mount as set forth in claim 6, wherein the rubber extension is provided with a thin-walled portion serving as a bending portion.

8. The engine mount as set forth in claim 7, wherein the rubber extension of generally cylindrical form is provided with at its entire lower circumferential extremity with a thick-walled portion.

9. The engine mount as set forth in claim 6, wherein the rubber extension of generally cylindrical form is provided with at its entire lower circumferential extremity with a thick-walled portion.

* * * * *